United States Patent [19]
Averill

[11] Patent Number: 6,082,514
[45] Date of Patent: Jul. 4, 2000

[54] ACTUATOR FOR CLUTCH RING

[75] Inventor: Bryan M. Averill, Tualatin, Oreg.

[73] Assignee: Warn Industries, Inc., Milwaukie, Oreg.

[21] Appl. No.: 09/225,997

[22] Filed: Jan. 5, 1999

[51] Int. Cl.[7] .......................... F16D 11/10; F16D 11/14; F16D 27/118
[52] U.S. Cl. ................................ 192/69.42; 74/473.37; 180/233; 192/69.9; 192/84.6; 192/84.92; 192/109 A
[58] Field of Search .............. 192/69.42, 69.4, 192/69.9, 84.6, 84.92, 109 A; 74/473.37; 180/233, 247

[56] References Cited

U.S. PATENT DOCUMENTS

| | | | |
|---|---|---|---|
| 1,220,320 | 3/1917 | Conwell | 192/109 A X |
| 1,440,341 | 12/1922 | Crispen | 192/69.9 X |
| 2,846,038 | 8/1958 | Brownyer | 192/69.9 X |
| 3,669,476 | 6/1972 | Wilson . | |
| 3,753,479 | 8/1973 | Williams . | |
| 3,878,926 | 4/1975 | Adachi | 192/109 A X |
| 4,534,455 | 8/1985 | Fujikawa . | |
| 4,650,056 | 3/1987 | Seennec . | |
| 4,694,943 | 9/1987 | Petrak . | |
| 4,775,040 | 10/1988 | Telford . | |
| 4,776,441 | 10/1988 | Kagata . | |
| 5,267,635 | 12/1993 | Peterson . | |
| 5,353,902 | 10/1994 | Flowtow . | |
| 5,429,221 | 7/1995 | Tanzer . | |
| 5,517,876 | 5/1996 | Genise et al. | 192/109 A |
| 5,740,895 | 4/1998 | Bigley . | |
| 5,788,008 | 8/1998 | Fort . | |
| 5,878,624 | 3/1999 | Showalter et al. | 74/473.37 |

Primary Examiner—Rodney H. Bonck
Attorney, Agent, or Firm—Robert L. Harrington

[57] ABSTRACT

An actuator for a clutch ring has a pivotally movable fork that engages and moves the clutch ring axially. The fork is coupled to a nut mounted on a screw. The screw is reversibly driven by a drive motor to move the nut between its limit of travel. A flange on the nut contacts the switch to interrupt power to the motor to control its travel limit. Leaf springs mounted on the fork engage a flange of the clutch ring to urge the clutch ring to move axially as the fork is pivotally moved. The clutch ring surrounds drive and driven component and is axially movable in one direction to be engaged with only one of the drive and driven components to uncouple the drive component from the driven component. The clutch ring is axially movable in the other direction to be engaged with both the drive and driven components to couple the drive component with the driven component.

10 Claims, 7 Drawing Sheets

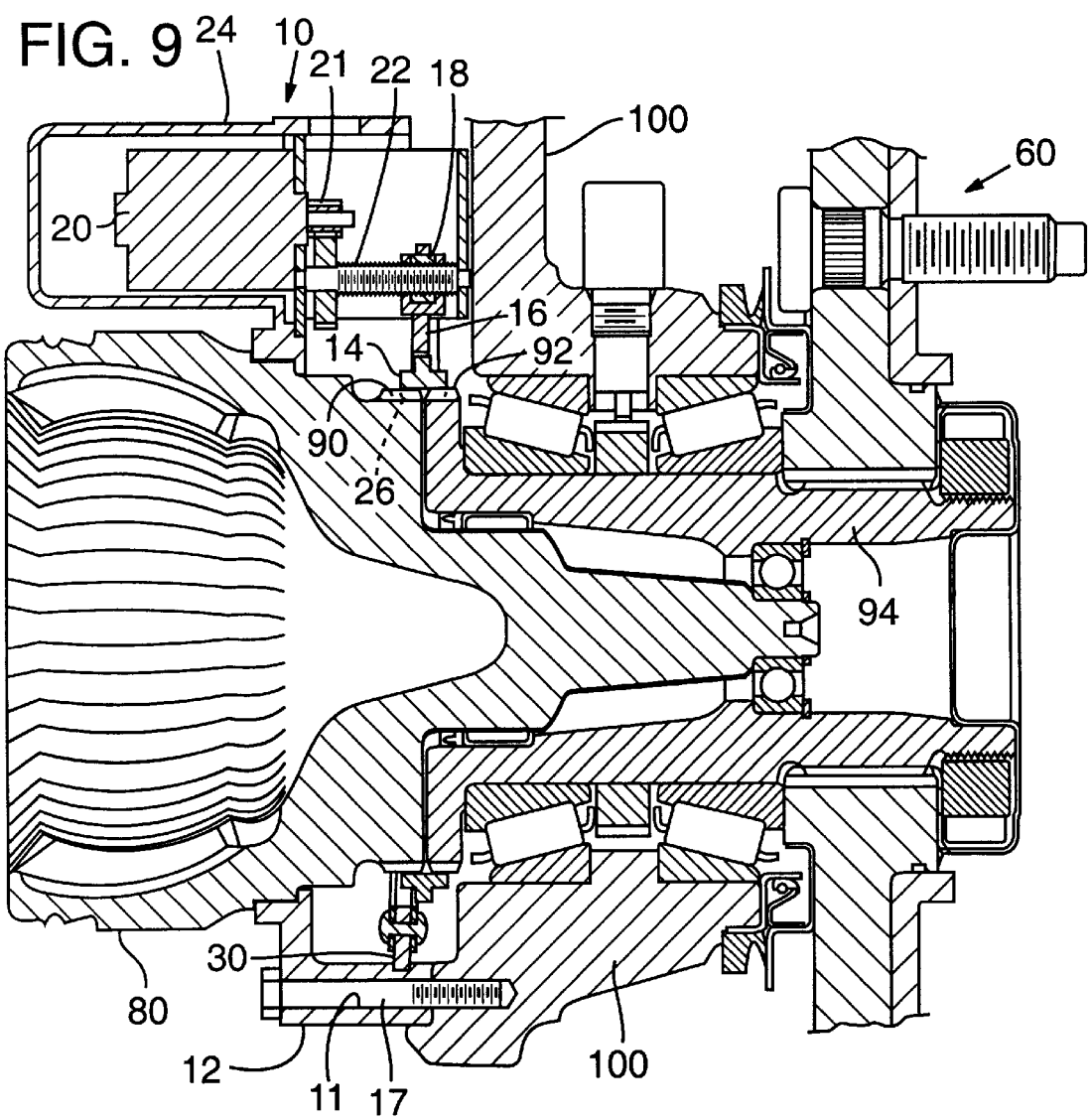

ACTUATOR FOR CLUTCH RING

FIELD OF THE INVENTION

This invention relates to the actuation of a clutch ring for engaging and disengaging a drive and driven shaft or axle, and more particularly it relates to the mechanism for shifting the clutch ring between engagement and disengagement positions.

BACKGROUND OF THE INVENTION

The need for engaging and disengaging a drive and driven shaft is particularly prevalent in vehicles that are shifted between two-wheel drive and four-wheel drive. Typically, a front wheel drive (or propeller) shaft extends from a vehicle's transfer case (or transmission) to a front wheel differential and a rear wheel drive (or propeller) shaft extends from the transfer case to a rear wheel differential. Axles extend from each differential to the respective right and left wheels. These components are sometimes collectively referred to as the vehicle's drive line. A clutch ring may be provided at any or several of a number of different locations between and inclusive of the transfer case (transmission) and wheel hubs. Typically either the rear wheels are permanently engaged or the front wheels are permanently engaged and that portion of the drive line does not likely include a clutch ring. It is the case, however, that a clutch ring is provided at or in the transfer case as well as at the wheel hubs of the disengageable wheels. Disengagement of both renders the drive line components between the wheel and transfer case inactive. Should the drive line be disengaged at the transfer case and not the wheel hubs, the components will be rotated by their connection to the wheel. Alternatively, the axles are disengaged from the propeller shaft at the differential (referred to as a center disconnect). The axles are still driven by the wheel but the propeller shaft (having the greater mass) is rendered inactive.

The clutch ring is shifted between positions of engagement and disengagement by actuators. Actuators can be mechanical (manual shift or automatic shift using cams) or they can be air actuated, hydraulic actuated or electric actuated. The present invention is directed to an electric actuator for a clutch ring.

An electric powered actuator as contemplated herein is provided with an electric motor connected to a shift fork which in turn is connected to a clutch ring. Whereas an electric motor, by design, will move a component between two precise positions, when energized it must be allowed to move the component to which it is connected fully between these positions. The clutch ring on the other hand cannot be required to move an exact distance at a given time as the clutch ring has to line up with the engagement features, i.e., splines on the component to which it is to be engaged. A delay must be permitted to allow for alignment. Accordingly, the fork or associated components of the fork must be constructed to permit such a delay. Whereas the above refers to an engagement problem, a similar problem occurs during disengagement. When attempting to disengage while the components are under high torque, movement of the clutch ring is strongly resisted due to frictional resistance, sometimes referred to as torque lock up or torque lock. Whereas the alignment problem is most commonly referred to herein, the solutions to that problem similarly apply to torque lock up occurring during disengagement.

The present invention is intended to optimize the construction of an electric powered actuator under the conditions as described above.

BRIEF DESCRIPTION OF THE INVENTION

The actuator of the preferred embodiment of this invention utilizes an electric motor, gear reduction and lead screw drive, and a somewhat standard annular clutch ring. The location of the connect-disconnect is provided where the clutch ring surrounds (entirely or in part) the juncture between a drive and driven component of a drive line and engages external splines of both components, and where the actuator of the clutch ring can be mounted to a non-rotating portion of the vehicle's chassis. The remaining components are a fork and a coupling component that couples the fork to a lead screw of the electric motor, and an annular bracket or housing that is fixedly secured to the vehicle's chassis and provides a mounting for the electric motor and fork and preferably provides an encasement for the actuator components.

The clutch ring is designed to move axially relative to the drive and driven components whereas the fork pivots about an axis formed by its engagement with the bracket or housing (pivotal axis of the fork), and preferably at a circumferential position diametrically opposed to the lead screw of the electric motor. A connection between the pivotally movable fork and the axially movable clutch ring is provided by a pair of leaf springs at each side of the fork. The leaf springs each include an engagement nib. The leaf springs are each anchored to the fork at a position spaced from the nibs with the nibs unconnected to the clutch ring but collectively urging confinement of the clutch ring within the fork. The nibs by design preferably engage the clutch ring at diametrically opposed positions on the clutch ring with a line drawn through the aligned nibs and axis of the clutch ring being substantially parallel to the pivotal axis of the fork. Such provides optimum balance of the forces applied to the clutch ring.

The nibs uniquely provide connection of the clutch ring to the fork whereby the fork can swivel relative to the clutch ring with the swivel connection allowing relative rotation at the points of engagement between the nibs and the clutch ring. Thus, the clutch ring is permitted the precise axial sliding as dictated by the splines of the drive line components, using a pivotal movement of the fork. These same nibs being provided on leaf springs permit but resist axial movement as between the clutch ring and nibs, i.e., whereas the nibs urge the clutch ring to move with the fork, when such movement is resisted, e.g., due to misalignment of the clutch ring splines with the splines of the driven component (or due to torque lock), the leaf springs will bend permitting continued movement of the fork and delayed movement of the clutch ring. The springs nevertheless continuously urge movement of the clutch ring until the splines are aligned. The springs then move the clutch ring to the position of the fork.

The leaf springs are preferably preloaded to a desired urging pressure but such loading of the leaf springs does not translate to increased frictional engagement between the nibs and the clutch ring. With the clutch ring centered in the fork, the nibs are held apart by the thickness of the fork which is greater than the thickness of the clutch ring. This permits the clutch ring to freely rotate with the drive line components to which it is engaged without frictional interference from the nibs.

The coupling components of the preferred embodiment are considered to be cooperative features added to the electric screw mechanism of the electric motor and to the annular fork. The fork is provided with a pair of radially projected prongs that straddle a saddle configuration provided on the nut of the screw mechanism. The prongs are captured between axially spaced apart bosses on the nut which engage the prongs in both directions of travel of the nut, thus forcing the prongs back and forth between axial positions dictated by the nut's movement along the length of the motor driven lead screw. This arrangement permits pivoting of the fork about its pivotal axis at the opposite side of the bracket. The engagement of the prongs with the saddle configuration of the nut prevents rotation of the nut and induces axial movement of the nut upon turning of the lead screw by the motor.

A further feature of the saddle is the provision of a flange portion that projects from the saddle. A pair of switches are mounted at spaced positions along the screw and in the path of the flange portion of the nut as the nut is moved in one direction and then the other. Upon engagement of the flange portion with either switch, the motor is stopped until the direction of rotation of the screw is reversed.

The above description is intended to be a summary description of the preferred components and their inter-related functions. The invention will be more clearly understood and appreciated upon reference to the following detailed description and the drawings referred to therein.

BRIEF DESCRIPTION OF THE DRAWINGS

FIG. 9 is a view similar to FIG. 8 showing the clutch ring in engagement with both the drive and driven member.

DESCRIPTION OF THE PREFERRED EMBODIMENT

Figure 1:
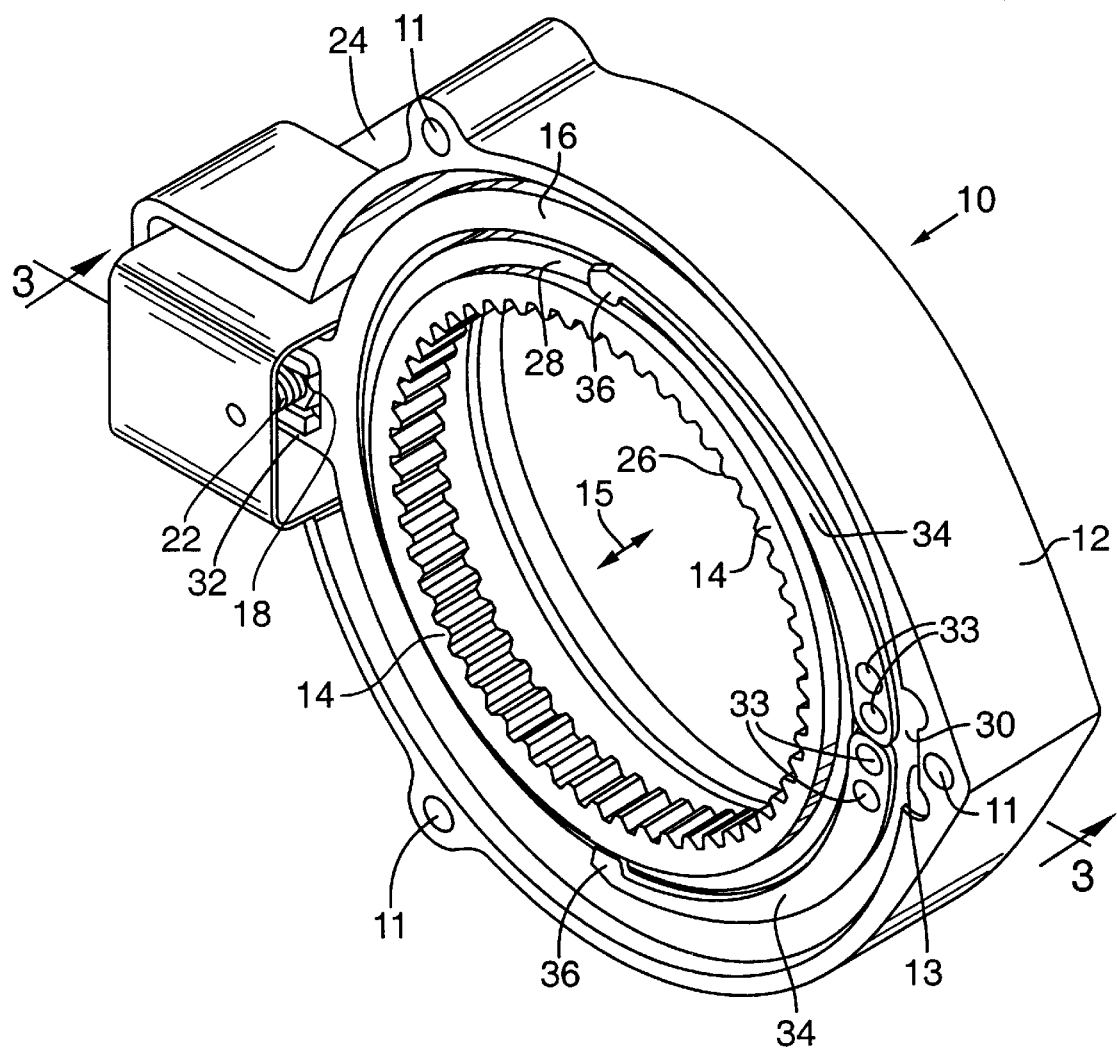
FIG. 1 is a perspective view of an actuator.

FIG. 1 illustrates an actuator 10 for connecting and disconnecting a drive component with a driven component of a vehicle drive line (discussed and illustrated later in connection with FIGS. 7–9). The actuator 10 has an annular bracket (housing) 12 that is fixedly mountable in a non-rotative manner to a fixed member of a vehicle chassis. The bracket 12 encases the actuator components and surrounds (encircles) the drive and driven components of the vehicle's drive line as can be viewed in FIGS. 8 and 9. The bracket 12 has through bores 11 to facilitate fixedly mounting the bracket 12 to the member 100 of the vehicle chassis by conventional fasteners such as bolts 17 (see FIGS. 8 and 9).

Figure 2:
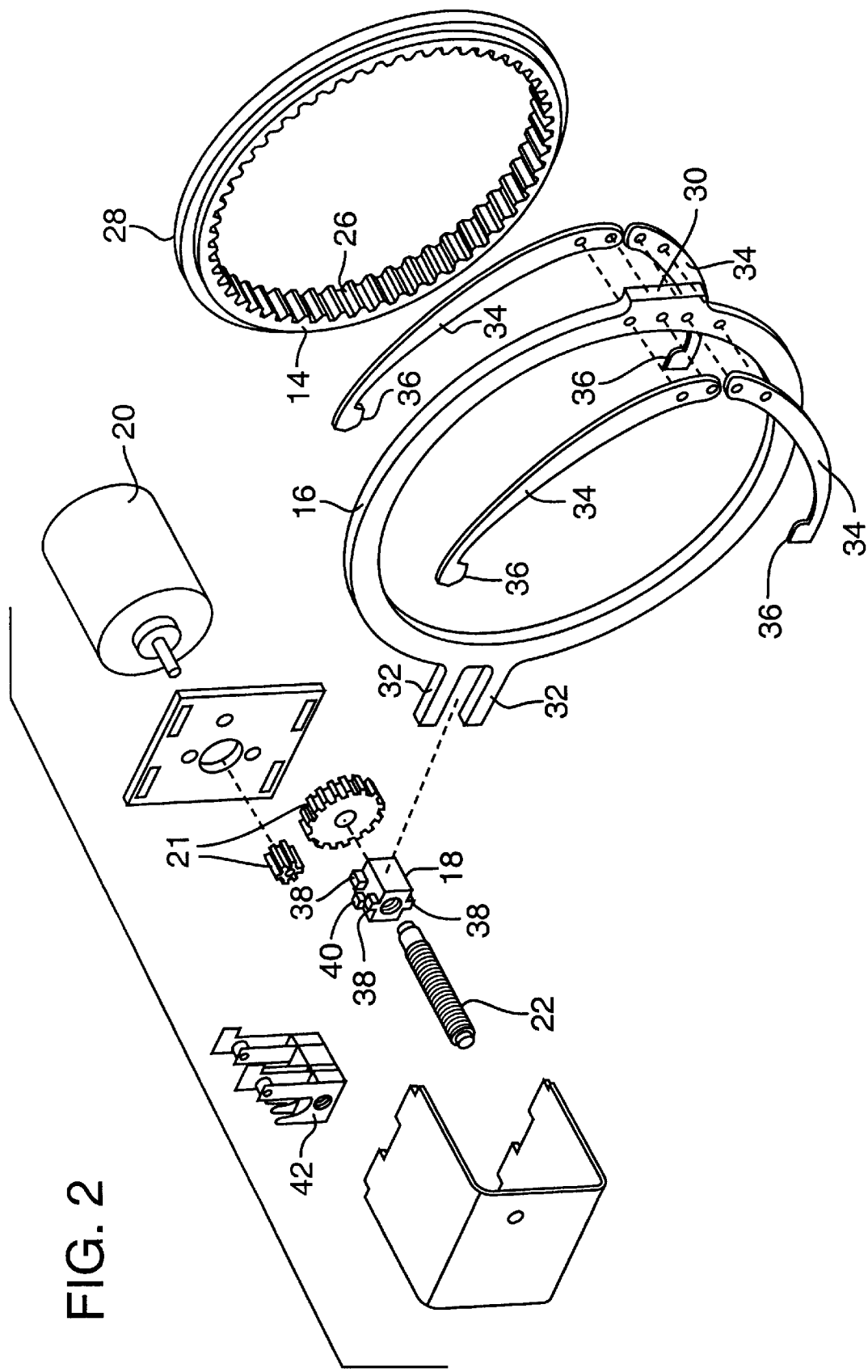
FIG. 2 is an exploded view of the internal components of the actuator of FIG. 1.

Referring to FIG. 1 with reference also to FIG. 2, a clutch ring 14 is axially movable, as indicated by arrow 15, in one direction to be engaged with only one of the drive and driven components and is movable in the other direction to be engaged with both the drive and driven components. When the clutch ring 14 is moved to be engaged with both the drive and driven components, the driven component is coupled to the drive component.

A shifting fork 16 coupled to a movable nut 18 moves the clutch ring 14 axially in the two directions. A reversible drive motor 20 (FIG. 2) rotatably drives a screw 22 on which the nut 18 is threadably mounted. The motor 20 is coupled to the drive screw 22 by a gear set 21. The motor 20 driven in one direction will cause pivotal movement of the fork 16 and the axial movement of the clutch ring 14 in one direction and the motor 20 driven in the opposite direction will move the fork 16 and the clutch ring 14 in the opposite direction. The drive motor assembly 20 is mounted in a formed cavity 24 of the bracket 12.

The components of the actuator that are encased in the bracket 12 as shown in FIG. 1 are shown in exploded view in FIG. 2. The clutch ring 14 is circular in shape having internal splines 26 and an external flange 28. The flange 28 is about the same but slightly less than the thickness of the fork 16. The fork 16 is sized to surround the clutch ring 14 and has a projecting tab 30 extending radially from its edge. The fork 16 has two adjacent prongs 32 projected radially from the fork at a position diametrically opposed to the tab 30.

Arcuate leaf springs 34 are mounted on each side of the fork 16 with the mounting fastener being near the tab 30. The springs 34 are mounted to the fork 16 by conventional fasteners such as rivets 33 (FIG. 1). The leaf springs 34 have substantially the same radius as the fork 16 and have nibs 36 that extend radially inward toward the center of the fork 16 when the springs 34 are mounted on the fork 16. The nibs 36 extending inwardly are spaced slightly away from the flange 28 of the clutch ring 14 with the clutch ring centered between the nibs (due to the greater thickness of the fork). The clutch ring 14 is thus retained in position inside the fork 16 with minimal resistance to rotation of the ring relative to the fork.

Figure 3:
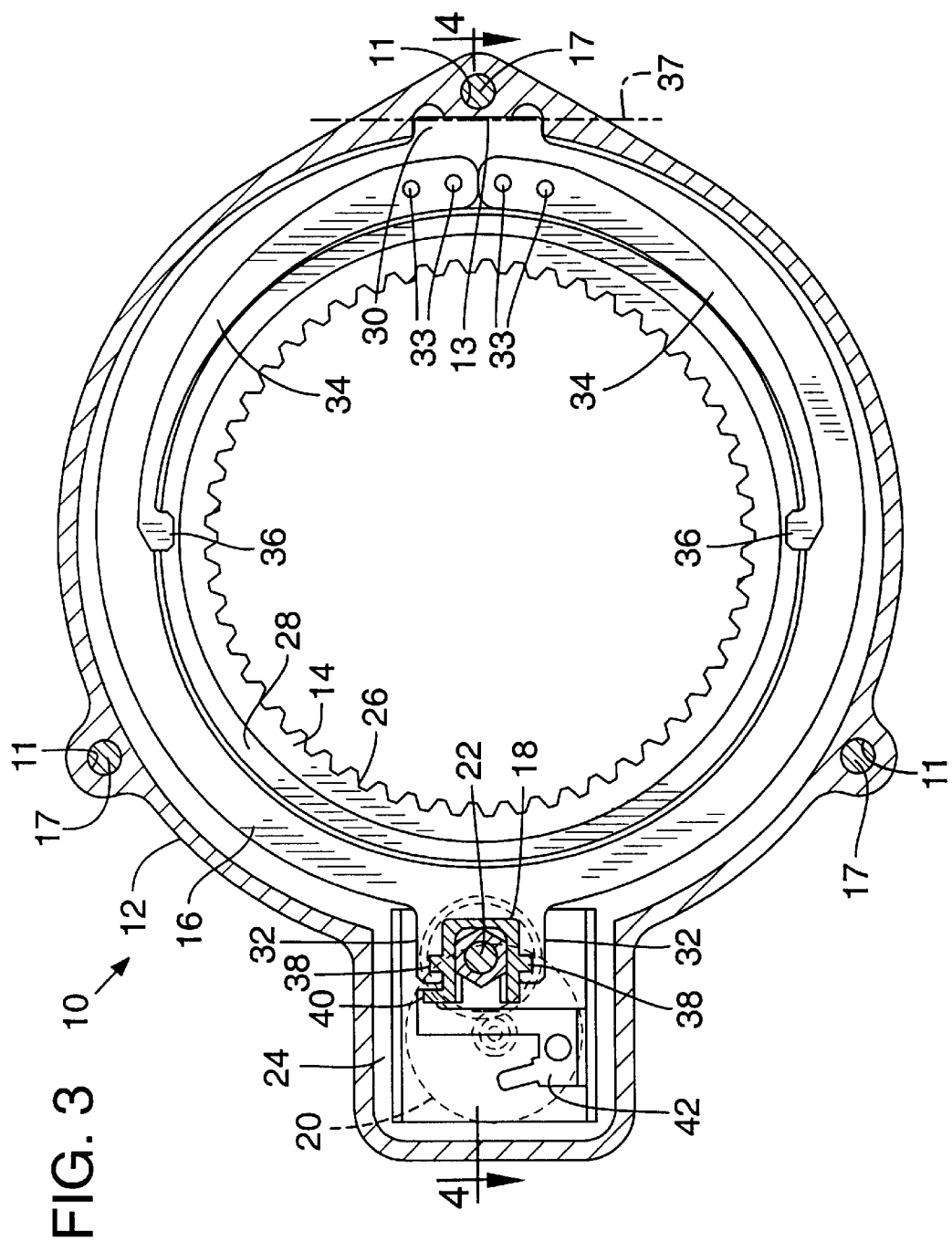
FIG. 3 is a cross sectional view taken on view lines 3—3 of the actuator of FIG. 1.

It is desirable to preload the springs and such preloading applies added pressure to the fork and greater urging of the clutch ring to its centered position inside the fork. The springs 34 will flex when the fork 16 is pivoted and when the clutch ring 14 resists movement, e.g., due to spline misalignment or torque lock. Such flexing of the springs permits the fork 16 to continue its pivoting movement when a corresponding movement of the clutch ring is prevented. When the resistive force applied to the clutch ring is relieved, the tensioned leaf springs 34 will urge the clutch ring 14 to move axially to a centered position between the nibs. Optimally, as illustrated in FIG. 3, the nibs 36 are diametrically opposed one from the other and a line passing through the nibs (and through the center of the clutch ring) is parallel to the pivotal axis 37 of the fork. Such positioning of the nibs balances the urging force applied to the clutch ring.

The nut 18 is substantially rectangular and has bosses 38 (FIG. 2) which extend outwardly from the body of the nut 18. The bosses 38 and the flat of the nut from which the bosses extend define a saddle portion of the nut. The prongs 32 of the fork 16 will fit in the saddle portion (between the bosses 38) of the nut 18 when the units are assembled. The prongs 32 fitted to the saddle portion of the nut 18 and against the flat sides of the nut prevent rotation of the nut 18 as the screw 22 is driven by the motor 20. Thus, as the screw 22 is rotatably driven in either rotational direction, the nut 18 will travel along the length of the screw 22 and the prongs 32 of the fork 16 (being captive between the bosses 38) will follow the nut 18 to pivot the fork 16 on its fulcrum (notch 13, FIG. 1). The nut 18 has a projecting flange 40 that will engage contacts provided on a limit switch 42 at the two extreme positions as the nut 18 traverses in one direction and then the other along the screw 22. The limit switch will shut the power off to the motor 20 to stop movement of the nut 18 and thus the pivoting of the fork 16.

Refer to FIGS. 1 and 3 of the drawings which illustrate the actuator in an assembled state. As shown the tab 30 of the shifting fork 16 is in a notch (fork fulcrum) 13 of the bracket 12 (which defines pivotal axis 37) and the motor assembly 20 has been installed into the cavity 24 of the bracket 12. The prongs 32 of the fork 16 engage the saddle portion of the nut 18 and the fork 16 will be pivotally moved as the nut 18 traverses on the screw 22. The shifting fork 16 thus will be pivoted on the tab 30 fitting in the notch 13 of the bracket 12. The clutch ring 14 is held captive by the nibs 36 of the leaf springs 34 positioned at each side of the flange 28 of the clutch ring 14. It will be appreciated that the leaf springs 34 will yield when the fork is pivoted and the clutch ring 14 is not aligned with the engagement features, e.g., the splines on the driven component. This permits the shifting fork 16 to continue its pivoting movement without similar movement of the clutch ring, and upon alignment of the splines of the clutch ring with the driven component, the leaf springs 14 will urge the clutch ring 14 to move axially into a centered position in the fork and thus into engagement with the driven component.

Figure 4:
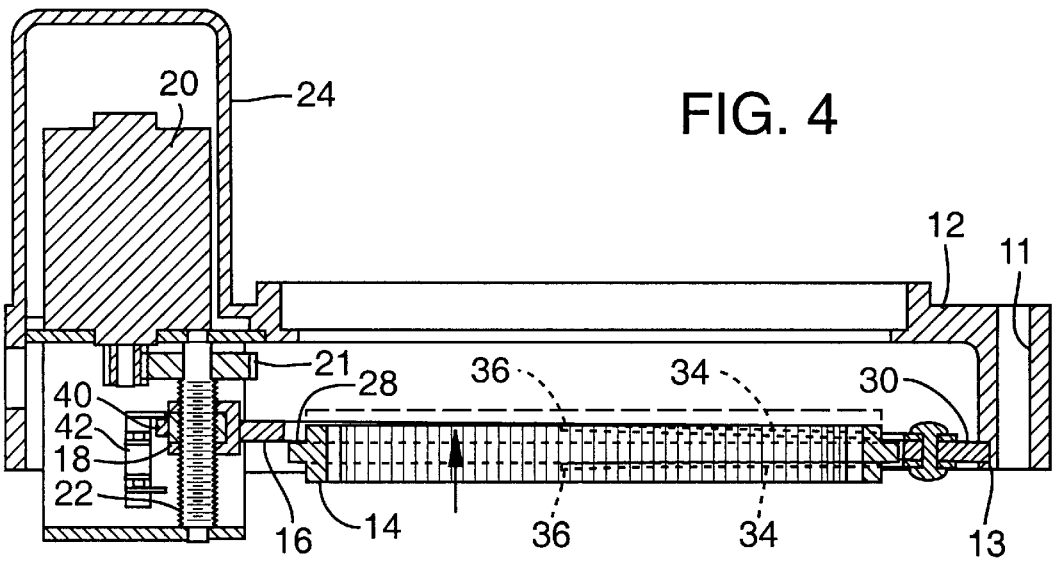
FIGS. 4, 5 and 6 are sectional views as if taken on view lines 4—4 of FIG. 3, illustrating stages of movement of the fork and clutch ring of the actuator of FIG. 1.
Figure 5:
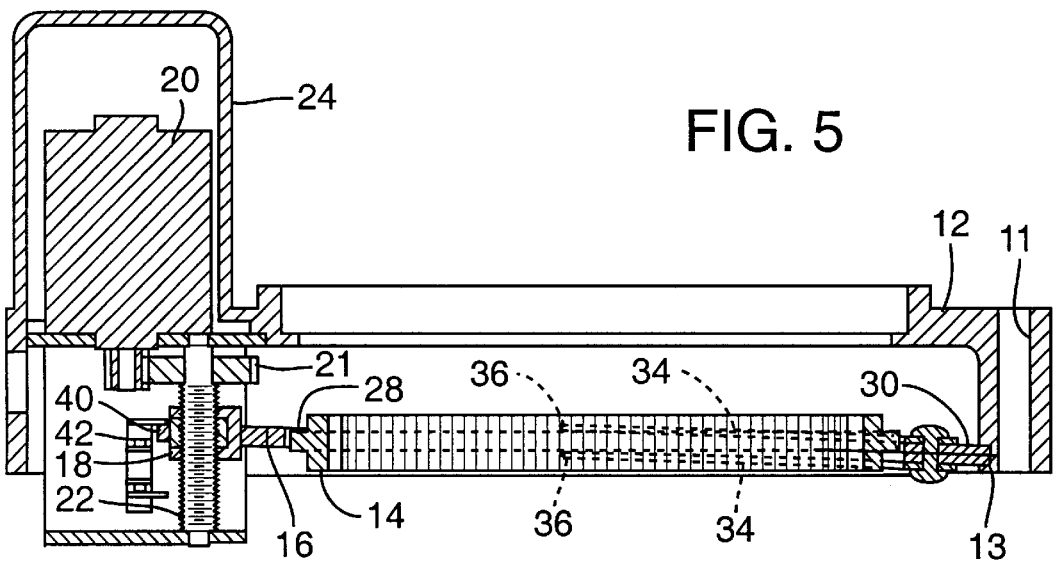
Figure 6:
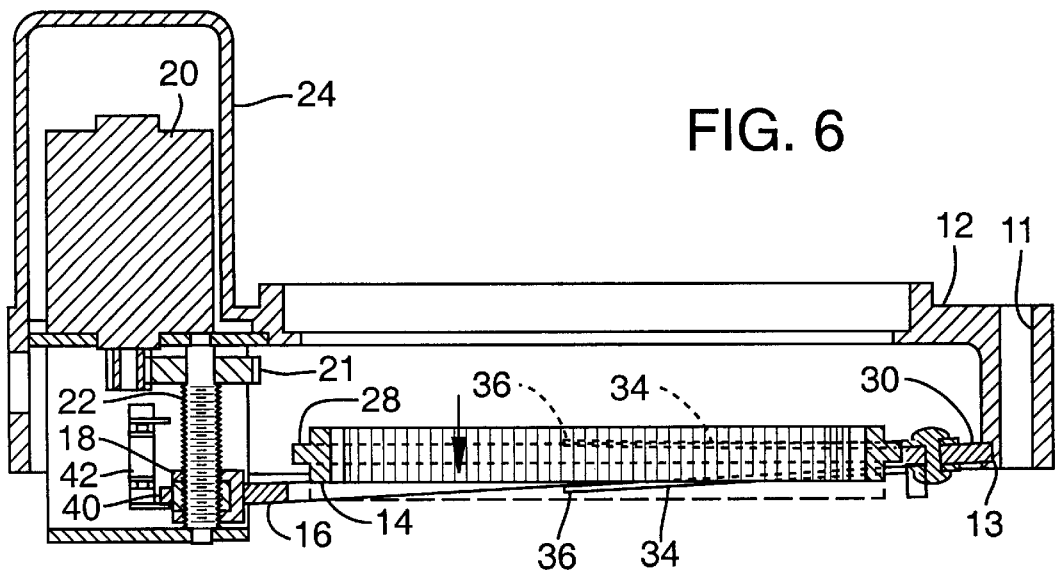

FIGS. 4, 5 and 6 illustrate the pivotal movement of the fork 16 and the axial movement of the clutch ring 14 caused by the movement of the nut 18 along the screw 22. FIG. 4 shows the nut 18 having moved to one of its limits, the motor 20 being stopped by the flange 40 of the nut contacting the switch 42. The clutch ring 14 is shown in solid lines under a condition where the clutch ring 14 has not been moved by the pivoting motion of the fork 16. The fork 16 has pivoted and since the clutch ring 14 has not moved the leaf springs 34 on the bottom side of the clutch ring yield or bend. The dash line shows where the clutch ring would be positioned without resistance. When the resistance to movement of the clutch ring 14 has been relieved, the clutch ring 14 will be moved axially by the urging of the leaf spring 34. This is shown in FIG. 5 where the clutch ring 14 has been moved axially by the urging of the nibs 36 of the leaf spring 34 acting against the flange 28 of the clutch ring 14. FIG. 6 illustrates the nut 18 moved to its other limit of travel and again the clutch ring 14 has a resistance to movement. The leaf spring 34 on the stop side of the clutch ring will yield (bend) permitting the pivoting of the fork 16. When the resistance to movement is relieved, the clutch ring 14 will be moved axially by the urging of the leaf spring 34.

One of the conditions where the clutch ring 14 has a resistive movement is when the spines of a drive component are not aligned with the splines of a driven component. The clutch ring 14 is engaged with, e.g., only the drive components and thus out of alignment with the splines of the driven component. When the splines of the drive and driven component become aligned, the clutch ring 14 will move axially to become engaged with both the drive and driven components due to the urging of the leaf spring 34. Another condition that provides resistive movement is when the clutch ring 14 is coupled to both the drive and driven component and torque is being applied by the drive component to the driven component. The force applied between the clutch ring, the drive component and the driven component generates a binding effect (torque lock) that can prevent the clutch ring 14 from moving until the applied force is relieved.

As previously mentioned, the actuator 10 is utilized to couple a drive component to a driven component by moving the clutch ring 14 to a position where the internal splines 26 of the clutch ring 14 engage both the drive and driven components. The clutch ring 14 is moved to a position where the internal splines 26 engage only one of the drive and driven component to uncouple the drive component with the driven component. It is to be understood, however, that the actuator 10 may be applied to a vehicle to provide a connect/disconnect mechanism at various positions in the drive line of a vehicle.

Figure 7:
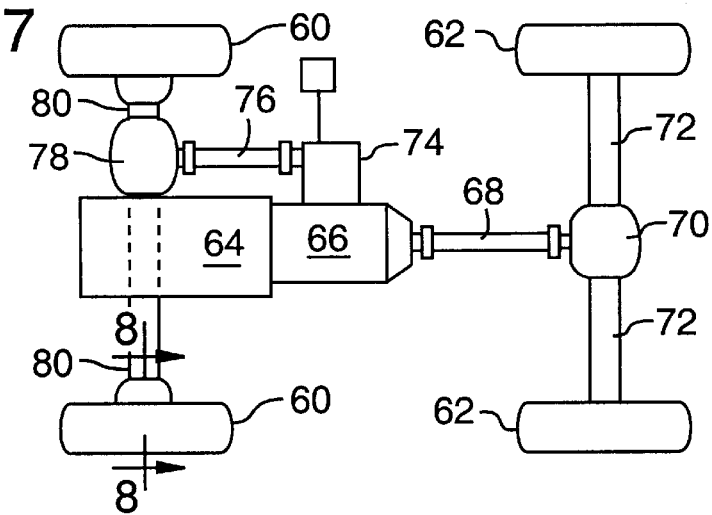
FIG. 7 is a schematic drawing of a vehicle.

FIG. 7 diagrammatically illustrates a vehicle that has front wheel sets 60 and rear wheel sets 62. In this example, the vehicle is a four-wheel drive vehicle and may be operated in either two-wheel drive mode or four-wheel drive mode. An engine 64 supplies power to a transmission 66 which in turn is coupled to a propeller shaft 68 that drives the rear wheel set 62 through a differential 70. Axles 72 extend from the differential 70 to each of the wheel sets 62. The transfer case 74 coupled to the transmission 66 has a drive shaft 76 coupled to a front differential 78. Axles 80 extend from the differential 78 to each of the wheel sets 60. Typically the transfer case 74 has shift mechanism that will transmit power to the front propeller shaft 76 or is shiftable so that it does not provide power to the front drive shaft 76. When the transfer case 74 is shifted to the mode where it does not supply power to the front drive shaft 76, the vehicle is then operable in two-wheel drive mode. To operate in four-wheel drive mode, the transfer case 74 is shifted such that the transfer case provides power to the front propeller shaft 76.

The front wheel sets 60 are uncoupled from the front axles 80 when the vehicle is operated in two-wheel drive mode so that the wheel sets 60 do not drive the front axles 80 to transmit rotative power through the differential 78 and the drive shaft 76 to the transfer case 74. This is desired to improve vehicle efficiency.

The actuator 10 of the present invention is suited to provide a coupling member between the front wheel sets 60 and the front axles 80 and is further suited to be applied to the front differential 78 whereat the actuator 10 will disconnect one of the axles 80 from the wheel sets 60. Also the actuator 10 may be applied to the transfer case for shifting the transfer case between the two-wheel drive mode and the four-wheel drive mode. Additionally, the transfer case typically, in combination with the transmission 66, has a high and low range and the actuator 10 is suited for handling these shift requirements.

Figure 8:
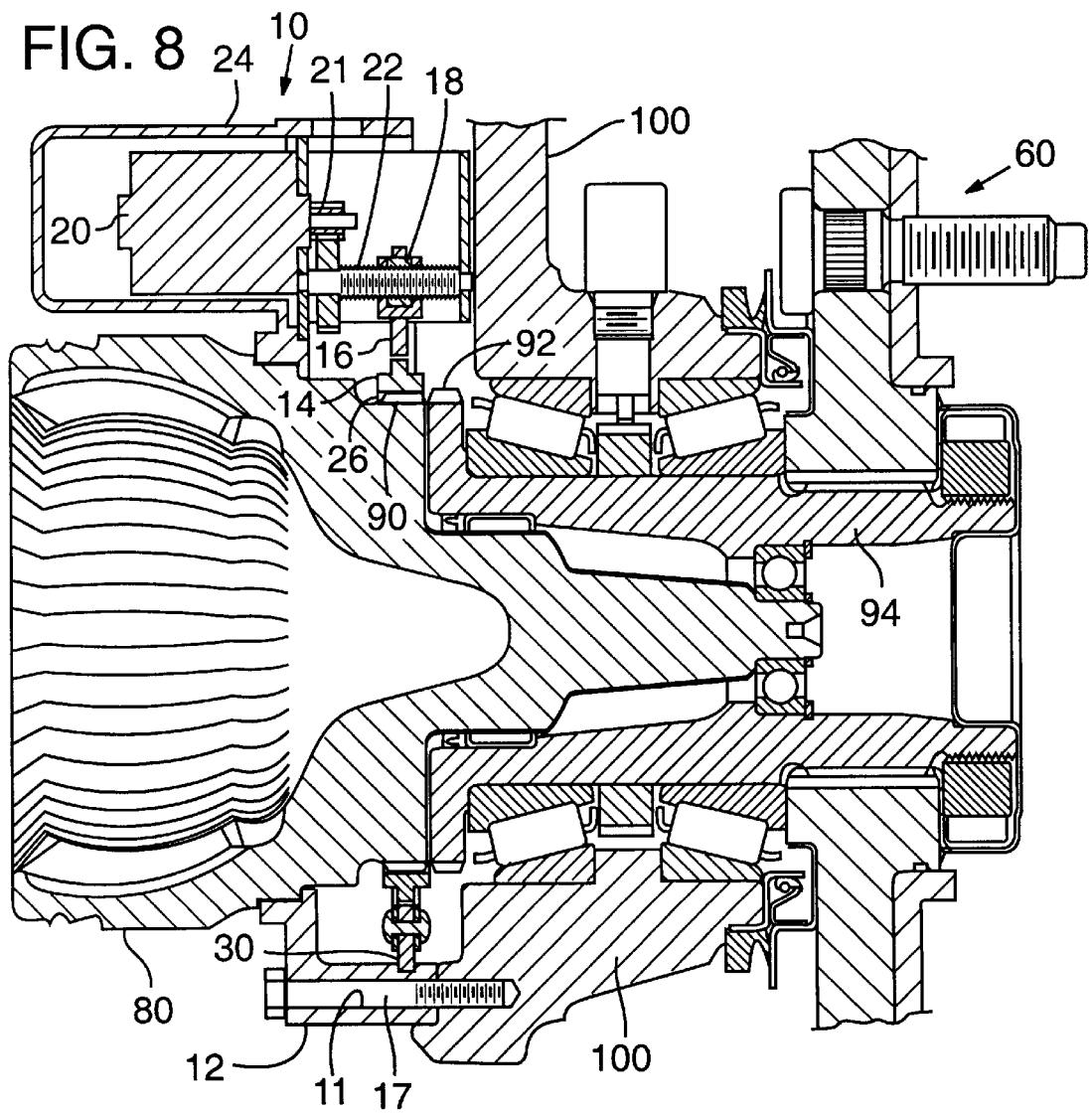
FIG. 8 is a view of a wheel assembly of the vehicle of FIG. 7 including the actuator of FIG. 1 and showing the clutch ring in engagement with only one of a drive and driven component.

FIGS. 8 and 9 illustrate one example of the application of the actuator 10 of the present invention. In FIGS. 8 and 9 the actuator 10 is applied to a wheel hub to couple a wheel spindle 94 to the drive axle 80 and to uncouple the wheel spindle 94 from the drive axle of the front wheel sets 60. As shown, the actuator 10 is rigidly mounted in a non-rotative manner to the knuckle 100 of the front wheel set 60. In FIG. 8 the clutch ring 14 has been moved to be engaged only with the splines 90 of the drive axle 80. When the clutch ring 14 has been moved to this position, the wheel spindle 94 of the hub is uncoupled from the drive axle 80. FIG. 9 illustrates the clutch ring 14 moved to be engaged with both the splines 90 on the drive axle 80 and the splines 92 of the spindle 94. This couples the wheel 60 to the drive axle 80 and when the power is transmitted through the front drive shaft 76 through the differential 78, the wheels 60 will be driven by the rotative power transmitted from the engine 64.

Figure 10A:
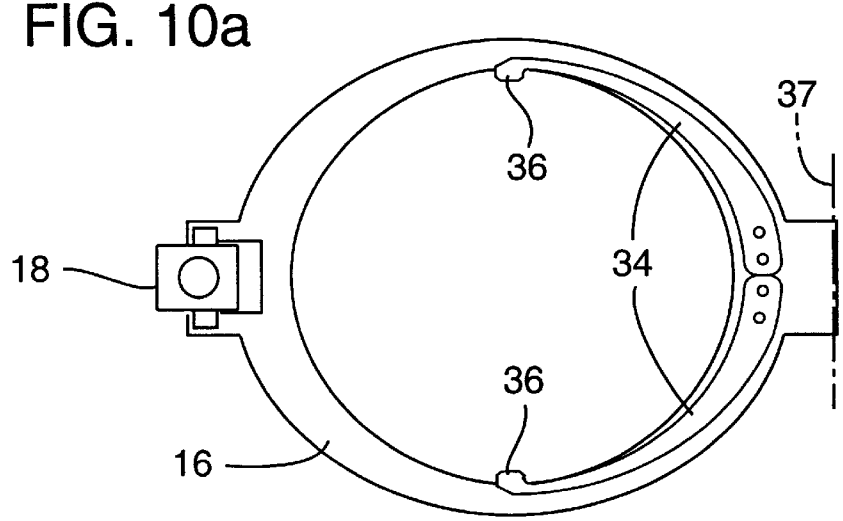
FIGS. 10a, 10b and 10c are schematic illustrations of alternative pivotal arrangements for the fork.
Figure 10B:
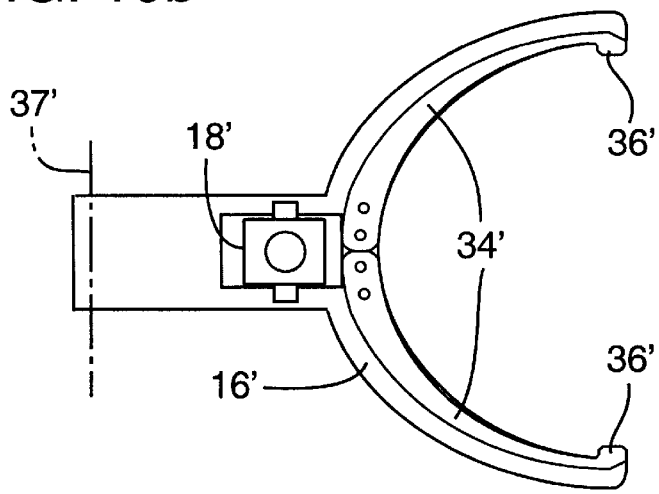
Figure 10C:
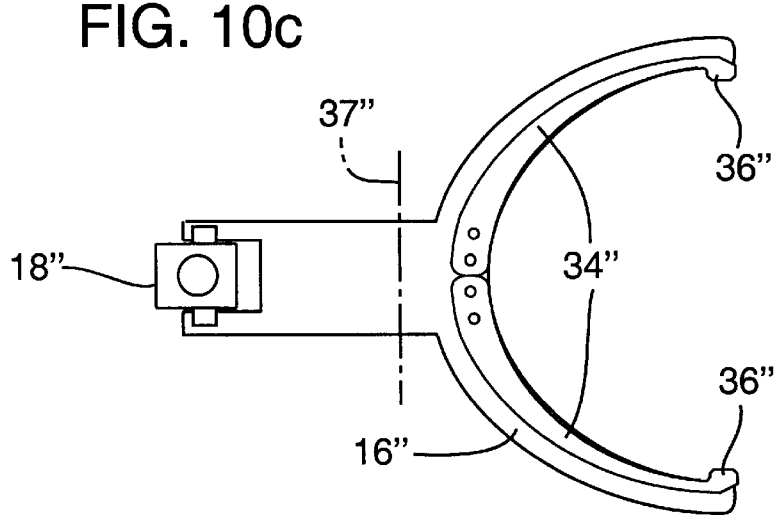

Those skilled in the art will recognize that modifications and variations may be made without departing from the true spirit and scope of the invention. A simple illustration of such a modification or variation is shown in FIGS. 10b and 10c. FIG. 10a illustrates the device of the preferred embodiment as discussed herein above. The fork 16 surrounds the clutch ring (not shown) and the nut 18 is diametrically opposed to pivotal axis 37. The nut being driven by the lead screw of the motor (also not shown) pivots the clutch ring about pivotal axis 37. In FIG. 10b, the nut 18' is shown located between the fork 16' and pivotal axis 371 but nevertheless pivots the nibs 36'. In FIG. 10c, the pivotal axis 37" and nut 18" are switched in position as compared to FIG. 10b but nevertheless produces the pivoting of the fork 16" and thus the nibs 35". The invention is therefore not to be limited to the embodiments described and illustrated but is to be determined from the appended claims.

The invention claimed is:

1. A connect-disconnect mechanism for the drive line of a vehicle comprising:

a drive component of the drive line and a driven component of the drive line in end-to-end relation and forming a juncture, a clutch ring permanently coupled to one of the drive and driven components and axially movable into and out of a coupled relation with the other of the drive and driven components to connect and disconnect the drive and driven components;

a fork surrounding the clutch ring at least in part, spring biased nibs carried by said fork and extended from the fork along each side of the clutch ring to urge confinement of the clutch ring within the fork, an extension of said fork pivotally mounted to the vehicle and a motor member mounted to the vehicle engaging said fork to force pivoting of said fork and axial urging of said clutch ring into one of the coupled and uncoupled relation with the other of said drive and driven components.

2. A connect-disconnect mechanism as defined in claim 1 wherein the motor member is a reversible electric motor rotatably driving a lead screw and a nut threadably engaging the lead screw and translated along the lead screw back and forth in response to rotation thereof, said nut engaging the fork to force pivoting of said fork.

3. A connect-disconnect mechanism as defined in claim 2 wherein the nut urges the fork in both the coupled and uncoupled relation with the other of said drive and driven components.

4. A connect-disconnect mechanism as defined in claim 1 wherein a pair of nibs is provided on each side of the clutch ring, each pair of nibs positioned diametrically opposed to each other relative to the clutch ring, and the pairs of nibs at each side of the clutch ring spaced apart whereby with the clutch ring centered in the fork the nibs are in non-interfering relationship with rotation of the clutch ring.

5. A connect-disconnect mechanism for a vehicle shiftable between two-wheel drive and four-wheel drive comprising:

a drive line for a vehicle chassis having front and rear wheel sets, said drive line extending between a transmission and one of the sets of front wheels and rear wheels of the vehicle and including a juncture between a drive component and a driven component of the drive liner said juncture located in close proximity to a non-rotating component of the vehicle's chassis;

an annular clutch ring mounted in non-rotative relation to one of said drive and driven components and in surrounding relation thereto and being axially movable along the length of the drive line into engagement and in surrounding relation to the other of said drive and driven components;

an annular bracket surrounding at least one of said drive and driven components and fixedly mounted to the non-rotating component of the vehicle's chassis, said bracket having circumferentially opposed sides, an electric motor mounted to said bracket at one circumferential side and a fork fulcrum provided on the bracket at the other circumferential side of the bracket, said electric motor including a driven member driven by said electric motor axially along the length of the drive line between first and second positions;

a fork surrounding said annular clutch ring having circumferentially opposed sides, one side pivotally engaged with the fork fulcrum of the bracket and the other side coupled by a coupler to the axially movable member of the electric motor, said fork including opposed spring members having opposed nibs at a midway position between the electric motor and fork fulcrum that urge confinement of the clutch ring to the fork; and said axial movement of the driven member driven by said electric motor and due to the coupling of the fork to the driven member the driven member providing pivotal movement of the fork about the fulcrum, and through the urging by the spring member nibs urging axial sliding movement of the clutch ring, said spring member nibs permitting resisted delayed movement of the clutch ring as may be required for engagement of the clutch ring with the other of the drive or driven components.

6. A connect-disconnect member as defined in claim 5 wherein the spring members are leaf springs normally engaging the axially opposed fork sides and in an axially spaced apart relationship to permit free rotation of the clutch ring relative to the fork.

7. A connect-disconnect mechanism as defined in claim 6 wherein the leaf springs are preloaded against the fork sides to provide the desired urging pressure of the nibs when contacting the clutch ring.

8. A connect-disconnect mechanism as defined in claim 5 wherein the electric motor drives a screw and the driven member is a nut threadedly engaged with said screw.

9. A connect-disconnect mechanism as defined in claim 8 wherein the coupler is provided on said driven member as a saddle configuration and prongs are provided on said fork that engages said configuration, said prongs and saddle configuration cooperatively arranged to prevent relative turning of the nut on the screw and thereby provide translation of the nut axially along the screw, and to provide movement of the prongs with the movement of the nut and thereby pivoting of the fork.

10. A connect-disconnect mechanism as defined in claim 9 wherein limiting switches are provided along the length of the screw and at each side of the driven member, said driven member designed to engage a limiting switch in either direction of translation to establish a precise movement of the driven member between extreme positions of movement.

* * * * *